United States Patent [19]

Klein

[11] 4,117,938
[45] Oct. 3, 1978

[54] PROTECTOR ARM

[75] Inventor: Herbert H. Klein, Arlington Heights, Ill.

[73] Assignee: Unarco Industries, Inc., Chicago, Ill.

[21] Appl. No.: 707,686

[22] Filed: Jul. 22, 1976

[51] Int. Cl.$^2$ ............................................. A47F 5/00
[52] U.S. Cl. .................................... 211/191; 211/182; 214/16.4 A
[58] Field of Search ............... 211/191, 134, 182, 183, 211/189, 190; 108/109, 111; 248/345.1; 214/16.4 A

[56] References Cited

U.S. PATENT DOCUMENTS

| | | | |
|---|---|---|---|
| 2,968,409 | 1/1961 | Jurechko | 211/134 |
| 3,207,331 | 9/1965 | Chasar | 211/182 X |
| 3,323,655 | 6/1967 | Foran et al. | 211/134 |
| 3,606,229 | 9/1971 | Wall | 248/345.1 |
| 3,695,456 | 10/1972 | Lewis | 211/191 |

FOREIGN PATENT DOCUMENTS

| | | | |
|---|---|---|---|
| 510,086 | 6/1955 | Italy | 211/134 |
| 1,109,883 | 4/1968 | United Kingdom | 211/182 |

*Primary Examiner*—Roy D. Frazier
*Assistant Examiner*—Robert W. Gibson, Jr.
*Attorney, Agent, or Firm*—Norman Lettvin; Gerald S. Geren

[57] ABSTRACT

There is disclosed herein a rack system for use in a warehouse to store pallets loaded with goods. The system includes a plurality of racks which are separated by aisles. Each rack includes a plurality of vertical frames which are spaced apart so as to define storage rows. Each frame includes a plurality of vertical posts and horizontal pallet-rails. The pallet-rails are mounted to the posts so as to extend forwardly beyond the front posts. Thus when the rack is loaded, the front post is "buried" between rows of loaded pallets for protection against fork truck collision. Furthermore, with this positioning of the front post, the entrance or opening to the row is greater than with prior art constructions. The greater opening permits a forklift operator to more easily maneuver loads into the row or permits a reduction in the width of the aisle between racks.

A protector arm assembly is provided for mounting to the front post beneath the extended pallet-rail and extending forwardly of the post for preventing injuries to personnel and loads resulting from striking the end of the rail and for providing additional support for the rail.

7 Claims, 5 Drawing Figures

PROTECTOR ARM

BACKGROUND OF THE INVENTION

This invention relates to a rack system, for use in a warehouse, to store pallets loaded with goods.

Rack systems for storing pallets of goods are well known and usually include a plurality of racks for storing the goods. The racks are spaced apart so as to define an aisle within which forklift trucks move for either storing or retrieving palletized loads of goods from the racks. Each rack includes a plurality of spaced vertical frames which define storage rows. Each frame is vertically oriented and extends from the front to the back of the rack. Furthermore, each frame includes a plurality of hollow, channel-shaped, vertical posts or uprights, which are spaced apart approximately one pallet depth, and are connected to each other by horizontal and diagonal cross-braces. Laterally-extending pallet-rail supporting arms are secured to the uprights and horizontal pallet-rails are, in turn, secured to the support arms. The pallets are stored in the rows by placing the pallet between two adjacent rack frames and at upper positions, resting the pallet on pallet-rails of adjacent frames.

In conventional racks the front or forwardmost post is positioned at the front of the rack and at the front end of the pallet-rail. In this position the front post can be damaged by blows received from both loaded and unloaded forklift trucks as they move in the aisle between the racks or maneuver into and out of the storage rows while storing or retrieving loads from a rack.

In a recent development, a lower portion of the front post is bent rearwardly so as to provide a downwardly and rearwardly extending lower portion for the front post. This is sometimes known as the slope or cant-leg construction. This construction has reduced damage to the front post at lower levels, but the post may still be damaged at levels above the bend.

It is therefore an object of this invention to provide a rack system wherein the front post is positioned in a manner to provide support for the pallet-rail and yet minimize damage along its height due from blows from both loaded and unloaded forklift trucks.

This and other objects will become apparent from the following description and appended claims.

SUMMARY OF THE INVENTION

There is provided by this invention a rack system wherein the front post is positioned rearwardly of the front end of the pallet-rail. With this positioning, the end of the pallet-rail is supported in a cantilever manner. This rearward positioning permits the post to be "buried" between the pallets in adjacent rows when the pallets are stored in alignment with the ends of the pallet-rails. The rearward positioning also increases the size of the front opening to the row so that (1) the forklift may have more room to maneuver or turn into the row; or (2) the width of the aisle between racks can be reduced.

The pallet-rails are channel-shaped members, and since they extend forwardly of the rack, it is desirable to protect personnel and goods from injury due to striking the forward and exposed ends of the rail.

A forwardly-extending protector arm assembly is mounted on the front post at a position beneath and adjacent said forwardly-extending pallet-rail for minimizing injuries. In one embodiment the protector arm includes a horizontally-arranged and rearwardly-opening U-shaped member having a pair of legs which are connected at their forward end by a bight portion. The pallet-rail is aligned with a leg and terminates rearwardly of the bight portion. In addition to minimizing injury, the protector arm also provides some support for the forwardly-extending portion of the pallet-rail.

BRIEF DESCRIPTION OF THE DRAWINGS

FIG. 2A shows the prior art positioning of the front post and FIG. 2B shows the position of the front post in accordance with this invention;

DESCRIPTION OF THE PREFERRED EMBODIMENT

The Rack

Figure 1:
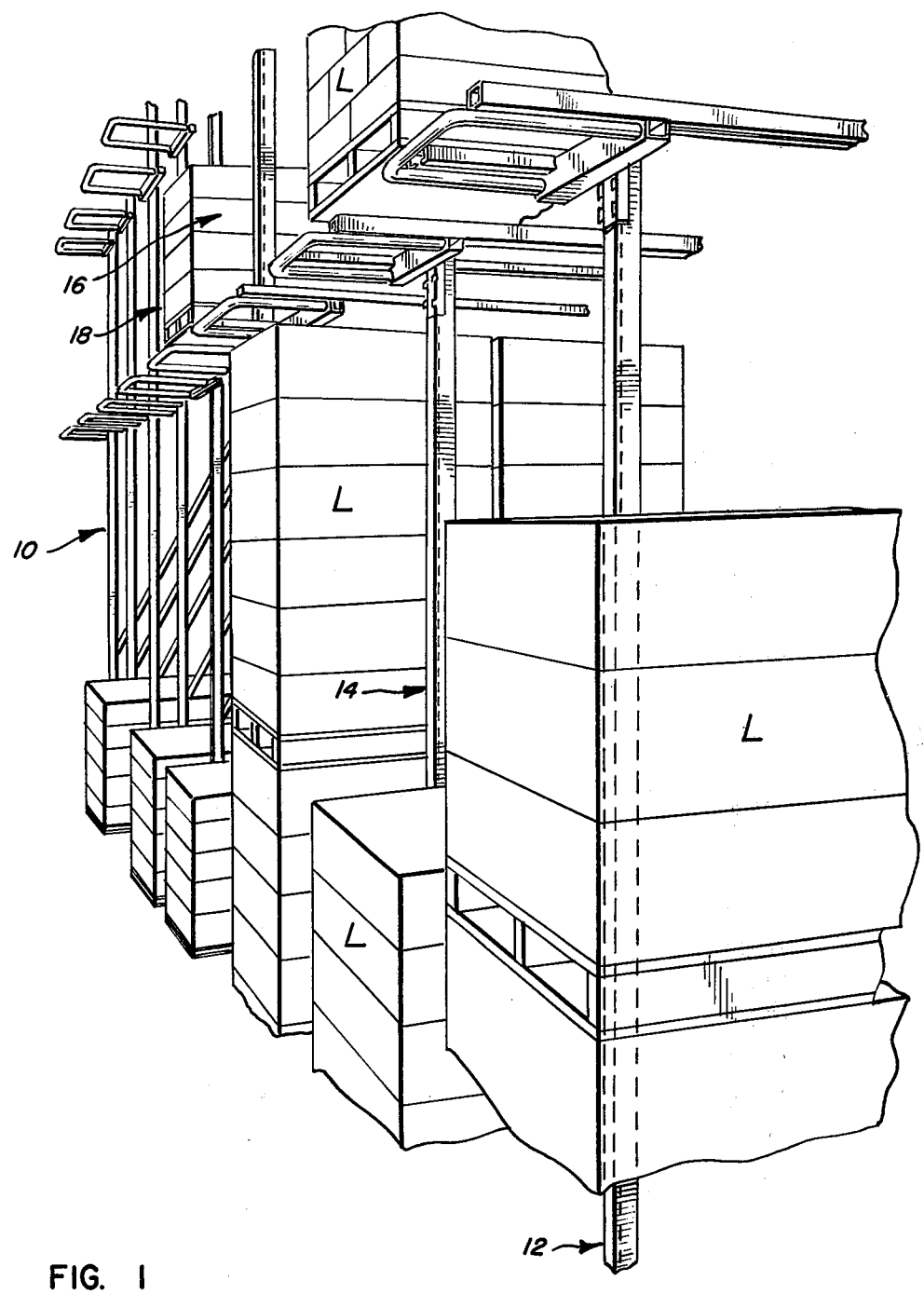
FIG. 1 is a perspective view of a loaded rack constructed in accordance with this invention and showing the recessed front post and the protector arm assembly.

Referring now to the drawings, there is shown a rack 10, which includes a plurality of vertical rack frames 12, 14, 16, and 18 which extend from the front to the back of the rack, and which are spaced apart so as to define pallet storage rows between adjacent frames. The distance between adjacent frames is usually equal to the width of one pallet. Palletized loads "L" are stored in the rows between the rack frames and at various heights.

Each rack frame, such as 18, includes a plurality of vertically-extending, channel-shaped, upright posts or columns. There is shown a forward or front post 20, and rearward posts 22, 24 and 26. The rearward posts are spaced apart a distance approximately equal to the depth of one pallet. The distance between the forward post 20 and the adjacent rearward post 22 is less than the depth of one pallet.

Figure 3:
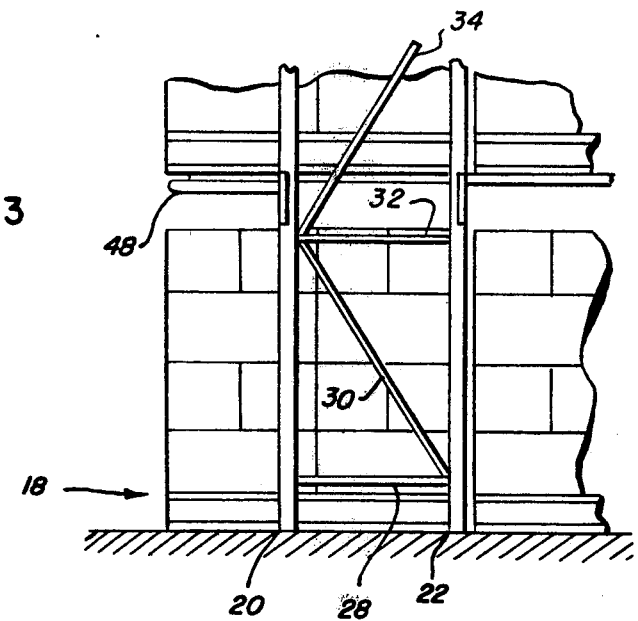
FIG. 3 is a side elevational view showing a portion of a rack frame having a rearwardly positioned front post with the protector arm assembly mounted thereon, and a plurality of loaded pallets.

The upright posts are secured together by a bracing system which includes horizontal and diagonal cross-braces, such as 28, 30, 32 and 34, as seen in FIG. 3.

Pallet-rail support arms, such as 36 and 38, are mounted on the upright posts at various heights and extend horizontally and laterally from the post. Pallet-rails, such as 44 and 46, are mounted on the support arms and extend horizontally from the back to the front of the rack frame. As can be seen in FIG. 1, pallet-rails can be provided at at least two different heights so as to provide for several storage tiers in each rows.

Since the spacing between the forwardmost post 20 and adjacent rearward post 22 is less than one pallet depth, the pallet-rail extends forwardly of the front post 20, a distance equivalent to the difference between the depth and spacing of the posts. Usually this is on the order of 12–18 inches. In such a construction the rail is supported in a cantilever manner forwardly of the post and is strong enough to support its portion of the pallet.

It should be appreciated that although it is preferred that the front post be less than one pallet depth from the adjacent rearward post, other post arrangements can be provided so that the front post is positioned rearwardly of the front end of the pallet-rail.

The Protector Arm Assembly

A protector arm assembly 48 is mounted to the front post 20 beneath the forwardly-extending pallet-rails 44 and 46 so as to minimize injury to warehouse employees and goods due to striking the exposed end of a rail. The protector arm also cooperates in supporting the cantilevered end of the pallet-rail. There are three styles of protector arms: the center-type, such as 48, which is mounted on frames intermediate the ends of the rack; and the end-type, such as 52 and 50, which is mounted on the frames at the ends of the rack.

Figure 4:
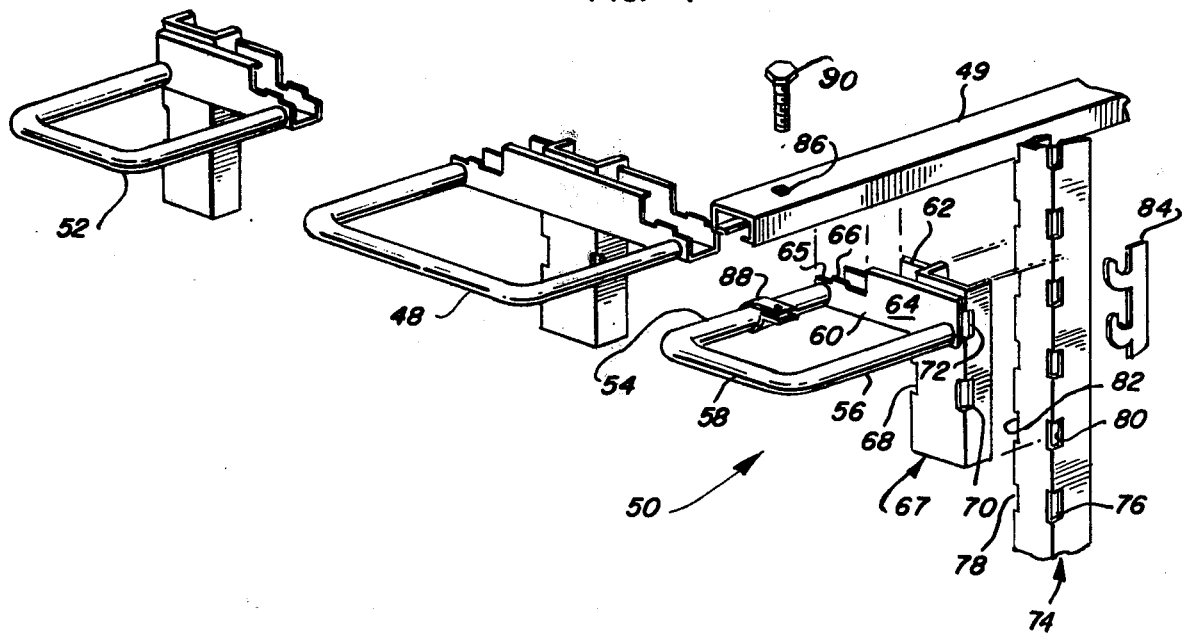
FIG. 4 is a perspective view showing right-hand, left-hand and center protector arm assemblies.

Referring now to FIG. 4, there is shown a channel-shaped pallet-rail 49 and a right-hand protector arm 50 for use on a right-hand end frame. The protector arm includes a U-shaped, rearwardly-opening bent tube which is arranged horizontally and has legs 54 and 56 and an interconnecting bight portion 58. The rearward ends of the legs 54 and 56 are welded to a channel-like cross-member 60. The cross-member includes upwardly extending front and back walls 62 and 64, which are notched adjacent the left-hand end so as to define a pallet-rail-receiving section 65.

The section 65 includes an upstanding guide lug 66 which fits within the slot in the bottom of the pallet-rail 49 so as to minimize lateral movement of the rail. The rail 49 is generally aligned with the leg 54 and is positioned so that an edge of the rail is positioned between both legs 54 and 56. A rearwardly-opening, vertically-oriented channel 67 is welded to the cross-member adjacent its right-hand end and provides a connector for mounting the protector arm assembly to the upright post. The corners of the connector include apertures, such as 68, 70 and 72, for cooperation in securing the protector arm to the post.

The upright post 74 is a rearwardly opening channel which includes a plurality of corner-mounting apertures, such as 76, 78, 80 and 82.

A wedge lock or hook 84, of the type shown in U.S. Pat. No. 2,815,130 is provided for insertion through a pair of adjacent corner apertures from the rear of the post and for insertion through two adjacent apertures in the channel 67, so as to securely mount the protector arm assembly 50 on the post 74 in a position adjacent but beneath the pallet-rail.

The pallet-rail includes a bolt-receiving aperture 86, and a clamp is carried on the leg 54 in alignment with the bolt-receiving aperture. A bolt 90 passes through the aperture 86 and cooperates with the clamp 88 to hold the rail and protector arm together as a unit.

The left-hand arm protector 52 is a mirror image of the right-hand arm 50. The center arm is similar to the left- and right-hand arms but includes two recesses for cooperation with two pallet-rails — one on either side of the connector channel which cooperates with the front post.

Rack Use

In loading the rack, the bottom or ground floor tier is loaded with the front face of the loaded pallets aligned with the forward ends of the pallet-rails. With this arrangement the front post is "buried" by the loaded pallets in adjacent rows and thus protected from blows from the forklift.

Figure 2B:
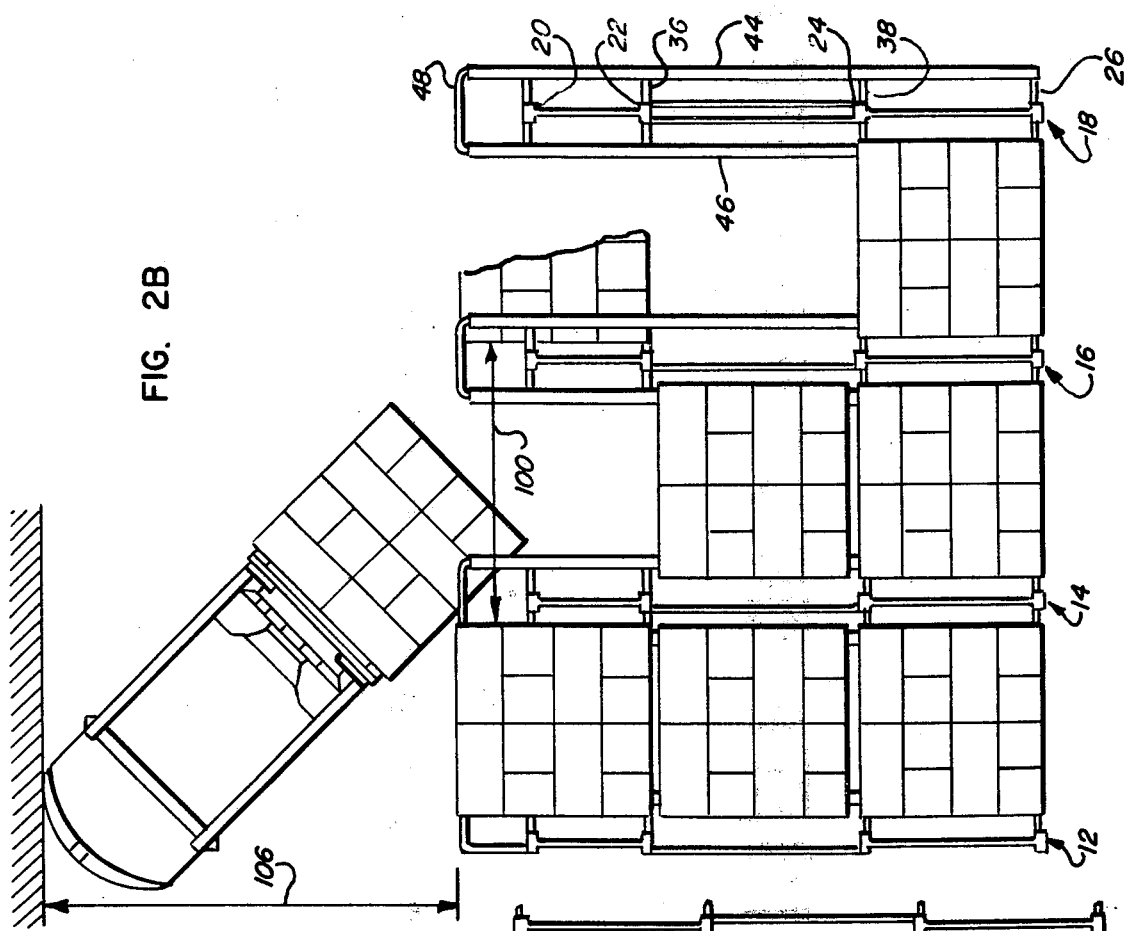
FIGS. 2A and 2B are top plan views of a partially loaded drive-in rack showing the rack frames and a forklift truck in the aisle.
Figure 2A:
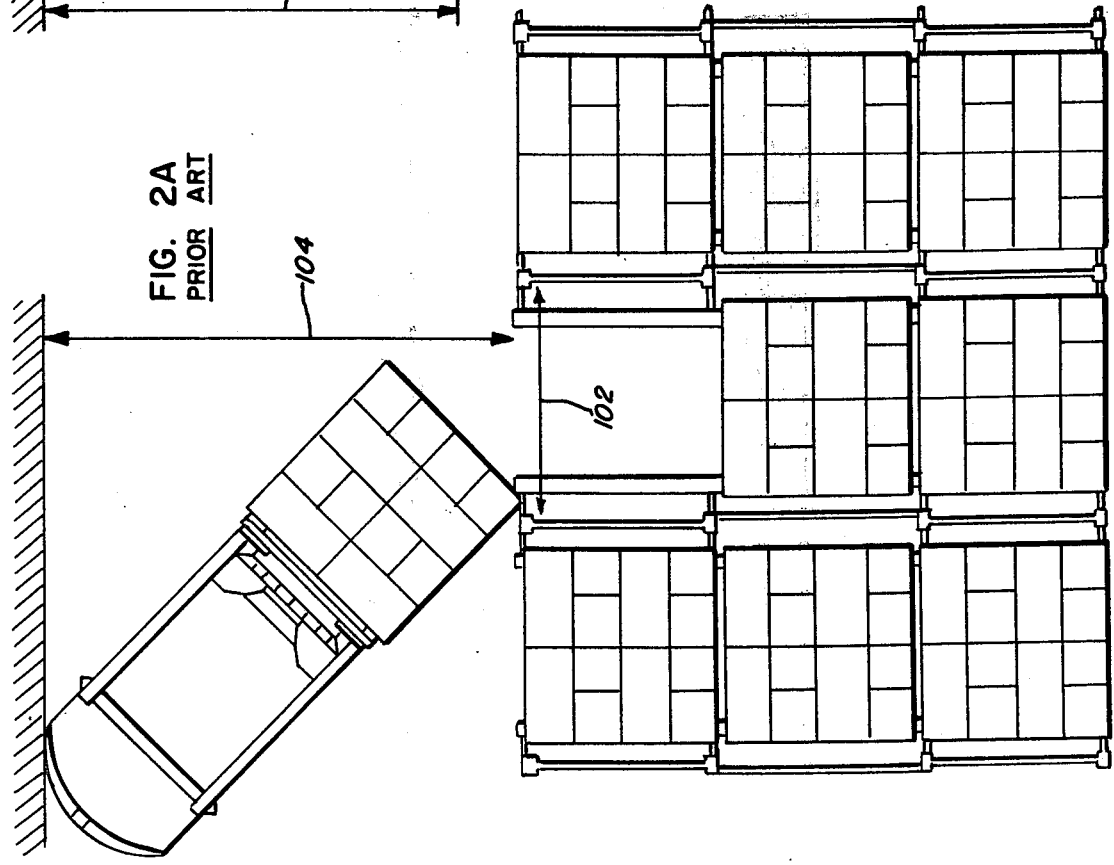

The rearward positioning of the front post also provides the forklift operator with more room within which to maneuver into the row, or a narrower cross aisle if so desired. The forklift in maneuvering loaded pallets into the row enters the row through an opening 100 which is defined by the forward corners of the loaded pallets previously stored in the adjacent rows. In the prior art as seen in FIG. 2A, the opening 102 is defined by the two forwardly positioned front posts. As can be seen, the opening 100 is greater than the opening 102, and thus providing the forklift operator with more room in which to maneuver when entering and leaving a storage row.

The wider opening provides greater "turn-in" clearance for aisles having the same width. However, if it is so desired, the aisle width can be reduced, by about 12–18 inches, while still providing the same "turn-in" clearance as with prior art racks. Narrower aisles may permit more efficient use of available warehouse space. The prior art aisle width 104 is greater than the aisle width 106 of this invention while the "turn-in" clearance is the same.

It will be appreciated that numerous changes and modifications can be made to the embodiment disclosed herein without departing from the spirit and scope of this invention.

What is claimed and desired to be secured by Letters Patent of the United States is:

1. A rack for use in storing loaded pallets which includes a plurality of vertical rack frames which are spaced apart so as to define a pallet-storage row between adjacent rack frames, each of said rack frames including a plurality of vertical posts, brace means interconnecting said posts, pallet-rail support means mounted to said posts, and a plurality of horizontal pallet-receiving rails supported by and mounted on said support means, said rails being constructed to receive and support loaded pallets wherein the improvement comprises: said rack frames having a front post positioned rearwardly of the front end of said pallet-rail so that a portion of said pallet-rail extends forwardly of the front post with the distance between the front post and forward end of said pallet rail being effective to permit stacking of loaded pallets on either side of said post and to extend forwardly of said front post and so as to protect said front post, and to provide a rack having the capability of providing greater turn-in clearance into a pallet row, and in combination therewith, protector arm assembly means for mounting on the front post beneath and adjacent said forwardly-extending pallet-rail, said protector arm assembly means extending forwardly of said rail for providing protection and minimizing injuries due to the forwardly-extending portion of said pallet-rail.

2. A rack for use in storing loaded pallets which includes a plurality of vertical rack frames which are spaced apart so as to define a pallet-storage row between adjacent rack frames, each of said rack frames including a plurality of vertical posts, brace means interconnecting said posts, pallet-rail support means mounted to said posts, and a plurality of horizontal pallet-receiving rails supported by and mounted on said support means, said rails being constructed to receive and support loaded pallets wherein the improvement comprises: said rack frames having a front post positioned rearwardly of the front end of said pallet-rail so that a portion of said pallet-rail extends forwardly of the front post, and in combination therewith, protector arm assembly means for mounting on the front post beneath and adjacent said forwardly extending pallet-rail, said protector arm assembly means extending forwardly of said rail, said protector arm assembly means includes means defining a horizontally arranged and rearwardly-opening U-shaped member having a pair of legs and a bight portion interconnecting the legs at the front ends thereof, said U-shaped member being constructed so that the bight portion is positioned forwardly of the pallet-rail and so that said rail is aligned with one of said legs.

3. A rack as in claim 2, wherein said protector arm assembly further includes: a cross-member connected to the rearward ends of said legs, said cross-member including means defining a pallet-rail receiving-and-aligning recess for engaging said pallet-rail and for laterally positioning said pallet-rail in alignment with one of said legs.

4. A rack as in claim 3, wherein said protector arm assembly further includes connector means associated with said cross-member, for cooperation with said post to secure said protector arm assembly to said post at an attitude effective to maintain said U-shaped member in a substantially horizontal position.

5. A rack as in claim 4, wherein said protector arm assembly further includes clamp means mounted on said U-shaped member and positioned with respect to said pallet-rail for cooperation in securing said pallet-rail to said protector arm assembly.

6. A protector arm assembly for use with a rack having a front post and a pallet-rail extending forwardly thereof in a cantilever manner, said assembly being constructed and arranged to minimize injuries and including:

U-shaped bent-tube means having a pair of legs and a bight portion interconnecting each of said legs at one end;

cross-member means to which the other end of each of said legs is connected, said cross-member including means defining pallet-rail receiving-and-aligning recess for cooperation with a pallet-rail to laterally position said rail in alignment with one of said legs; and connector channel means secured to said cross-member means which is shaped to matingly engage a front post and be secured thereto at an attitude effective to position said U-shaped member in a substantially horizontal position.

7. A protector arm assembly for use with a rack having a front post and a pallet-rail extending forwardly thereof in a cantilever manner, said assembly being constructed and arranged to minimize injuries and including:

U-shaped means having a pair of legs and a bight portion interconnecting each of said legs at one end;

cross-member means to which the other end of each of said legs is connected; and attachment means provided on said cross-member means shaped to be so secured to a front post so as to substantially horizontally position said U-shaped member so that a forwardly-extending portion of a pallet-rail is positioned between the legs of said U-shaped member and rearwardly of said bight portion.

* * * * *